(12) United States Patent
Bhatia et al.

(10) Patent No.: US 7,231,228 B2
(45) Date of Patent: Jun. 12, 2007

(54) SYSTEM AND METHOD FOR VOICE/DATA MESSAGING APPLICATION

(75) Inventors: Sudhir Bhatia, Brooklyn, NY (US); Alistair Hamilton, Stony Brook, NY (US); Luis F. Llamas, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 845 days.

(21) Appl. No.: 10/209,387

(22) Filed: Jul. 30, 2002

(65) Prior Publication Data

US 2004/0033781 A1    Feb. 19, 2004

(51) Int. Cl.
*H04M 1/00* (2006.01)

(52) U.S. Cl. .................... 455/556.1; 455/70

(58) Field of Classification Search ............. 455/562.1, 455/41.2, 90.1, 68, 566, 412.1, 550.1, 3.06, 455/556.1, 418, 420, 425, 70; 340/7.2, 7.34; 709/206, 132, 203; 705/14
See application file for complete search history.

(56) References Cited

U.S. PATENT DOCUMENTS

| | | | | |
|---|---|---|---|---|
| 5,910,769 A * | 6/1999 | Geisler | ..................... | 340/568.5 |
| 6,295,391 B1 * | 9/2001 | Rudd et al. | ................ | 382/313 |
| 6,343,358 B1 * | 1/2002 | Jaggar et al. | ............... | 712/227 |
| 6,370,568 B1 * | 4/2002 | Garfinkle | ..................... | 709/206 |
| 6,535,243 B1 * | 3/2003 | Tullis | ....................... | 348/207.1 |
| 6,859,134 B1 * | 2/2005 | Heiman et al. | .............. | 340/7.2 |
| 6,968,158 B1 * | 11/2005 | Bhuta et al. | .................. | 455/68 |
| 2002/0143860 A1 * | 10/2002 | Catan | ......................... | 709/203 |

* cited by examiner

*Primary Examiner*—Edward Urban
*Assistant Examiner*—Tu X. Nguyen
(74) *Attorney, Agent, or Firm*—Amin, Turocy & Calvin, LLP

(57) ABSTRACT

Described is an optical imaging system which a plurality of optical imaging devices coupled to one another via a communication network. Each of the optical imaging devices may include an apparatus for optically reading encoded data and storing the data in a data file, a voice recording apparatus for recording a voice message and storing the message in a message file and a voice reproducing apparatus. In addition, the device may include a file handling apparatus for assembling a transmission file and addressing the transmission file to an intended recipient one of the plurality of devices. The transmission file may include the data and message files. The transmission file is configured so that, upon receipt by the recipient device, the message file is automatically executed and played. Furthermore, the device may include a communication apparatus for communicating with other devices via the network, wherein the communication apparatus forwards the transmission file to the recipient device via the network. Thus, when the transmission device receives the transmission file, the message file is played and the data file may be displayed to the recipient.

18 Claims, 4 Drawing Sheets

SYSTEM AND METHOD FOR VOICE/DATA MESSAGING APPLICATION

BACKGROUND INFORMATION

A conventional scanner/imager is capable of capturing data, such as bar codes, images, etc. Such data may be transmitted, via a network, to other devices where the data may be viewed/utilized by a user. The scanners may be mobile and have a wide variety of utilization in different industries. Such mobile scanners may also communicate using a wireless communication network.

For example, a check-out clerk in a retail store may need a price check for a particular product. The check-out clerk would contact, e.g., via radio, a floor clerk. The floor clerk would have to find the particular product in the store and check the price displayed. If the displayed price does not match to the price shown by scanning the bar code of the product using a wireless scanner, the floor clerk has to contact a computer clerk. The computer clerk, using a main computer which holds pricing data, finds the price for the product and makes appropriate adjustment. The floor clerk check the price of the product using the wireless scanner again; and if that price matches to the displayed price, the floor clerk would contact, via radio, the check-out clerk to inform him of the correct price for that product.

SUMMARY OF THE INVENTION

The present invention related to a method and an optical imaging system which may include a plurality of optical imaging devices coupled to one another via a communication network. Each of the optical imaging devices may include an apparatus for optically reading encoded data and storing the data in a data file, a voice recording apparatus for recording a voice message and storing the message in a message file and a voice reproducing apparatus. Also, the device may include a data input arrangement, such as a keyboard, a keypad, a scanner/imager, etc.

In addition, the device may include a file handling apparatus for assembling a transmission file and addressing the transmission file to an intended recipient one of the plurality of devices. The transmission file may include the data and message files. The transmission file is configured so that, upon receipt by the recipient device, the message file is automatically executed and played.

Furthermore, the device may include a communication apparatus for communicating with other devices via the network, wherein the communication apparatus forwards the transmission file to the recipient device via the network. Thus, when the recipient device receives the transmission file, the message file is played and the data file may be displayed to the recipient.

DETAILED DESCRIPTION

Figure 1:
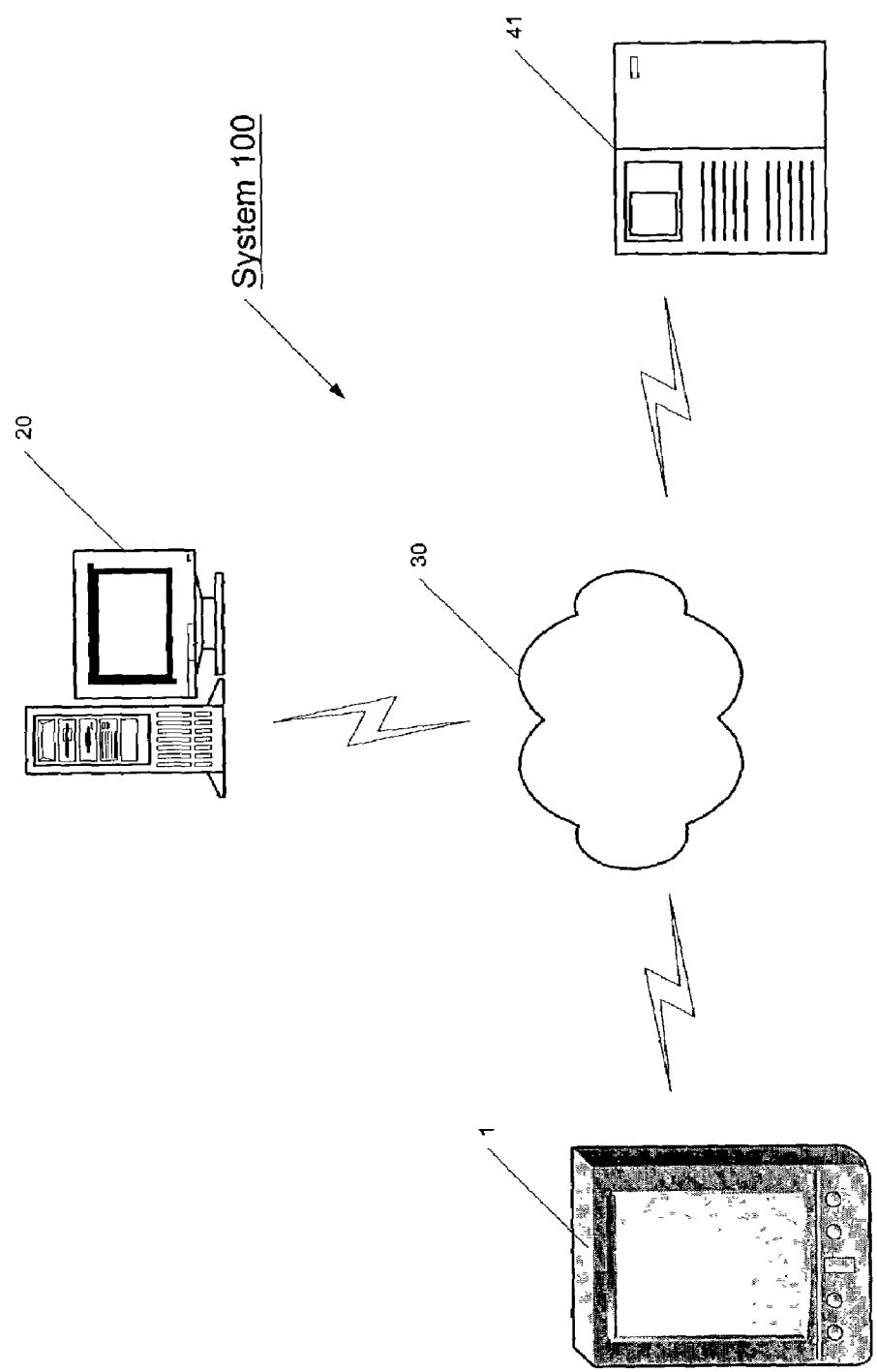
FIG. 1 shows an exemplary embodiment of a system according to the present invention.

FIG. 1 shows an exemplary embodiment of a system 100 according to the present invention. The system 100 may include, for example, a server 20, a plurality of mobile scanning devices (e.g., a device 1) and a stationary device (e.g., a device 41). Those skilled in the art will understand that devices besides dedicated scanning devices (e.g. PDAs) maybe used to perform the functions of the handheld scanning device 1. Thus, the term "handheld scanning devices" includes all portable devices capable of performing scanning or capturing of data. The device 41 may be a stationary device (e.g., a cash register arrangement) capable of viewing the captured data. In the alternative exemplary embodiment, the device 41 may also scan/capture the data. Both, the device 1 and 41 may have capability to generate and play voice files as well as view data files.

The devices 1, 41 and the server 20 communicate utilizing a communication network 30. The communication network 30 may be a local area network, a wide area network, the Internet, etc. The communication network 30 transmits data between the server 20 and the devices 1, 41, and the server 20 regulates the transmission of data within the network 30. The devices 1, 41 may be connected to the network 30 using, for example, a wireless communication protocol (e.g., Bluetooth, IEEE 802.11, etc.) (not shown), an ethernet connection, etc., as would be understood by those skilled in the art.

Figure 2:
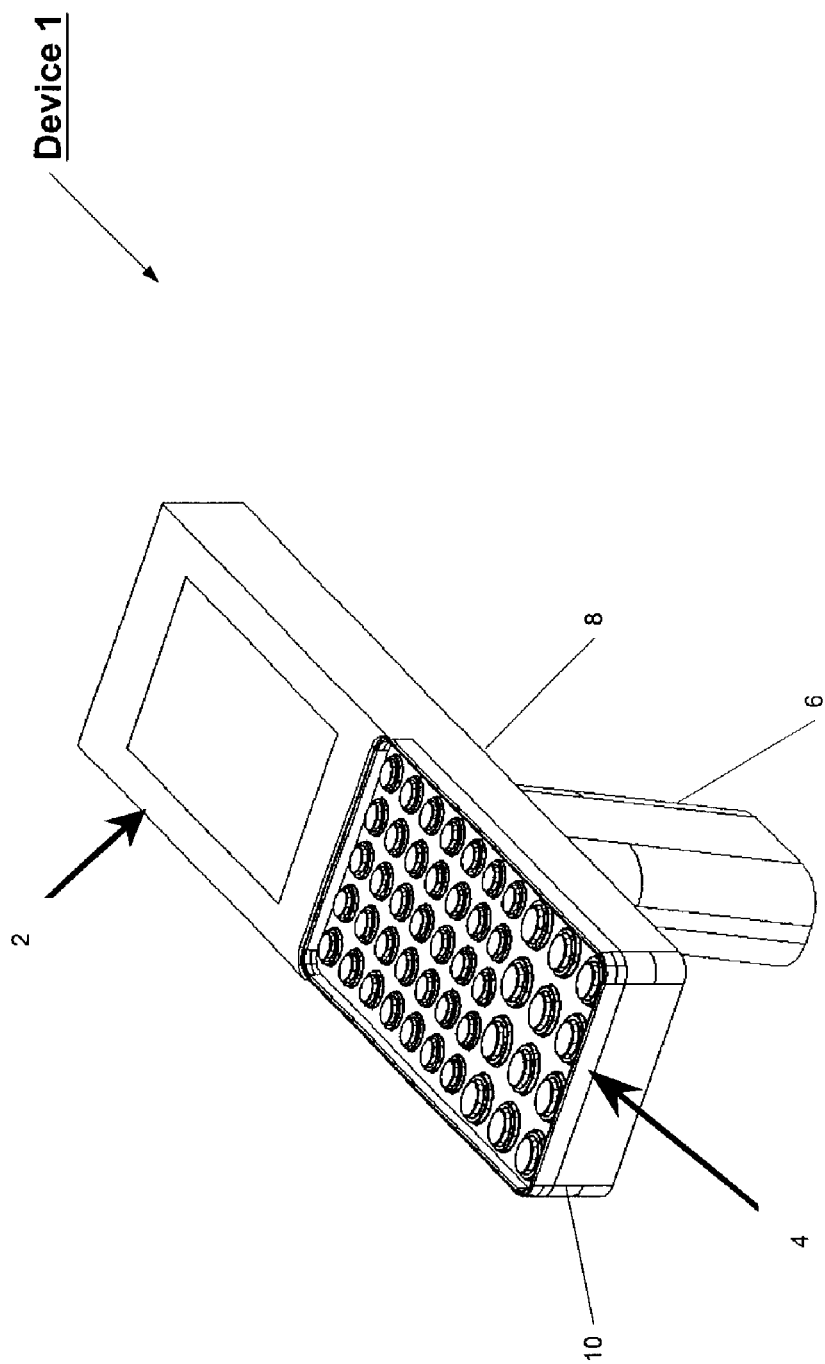
FIG. 2 shows an exemplary embodiment of a device according to the present invention.

FIG. 2 shows an exemplary mobile device 1 according to the present invention. In particular, the device 1 may be a hand-held scanner which may include an output arrangement 2 (e.g., a LCD display, a printer), an input arrangement 4 (e.g., a keypad, a keyboard, a touch screen, a voice recognition device), a microphone 8 and a speaker 10. In addition, the device 1 may include a conventional scanning arrangement and may optionally include a photo camera (not shown).

Figure 3:
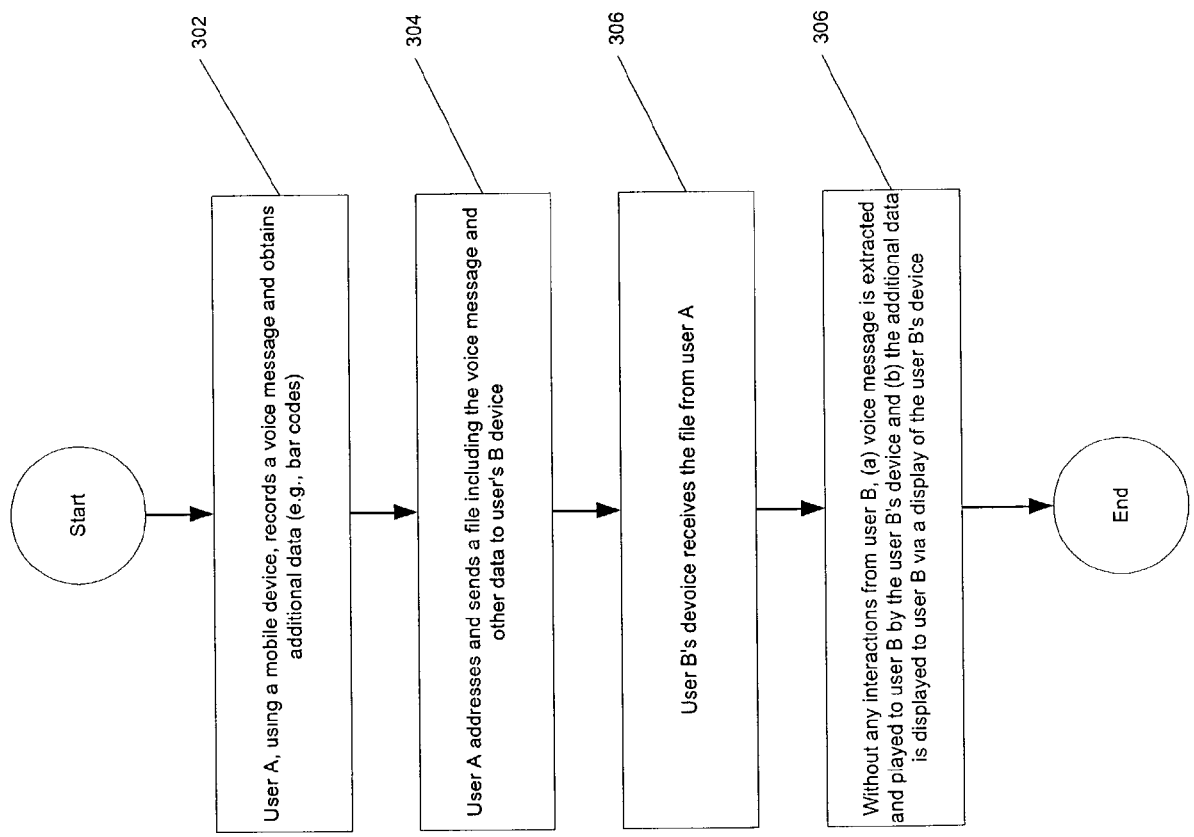
FIG. 3 shows an exemplary embodiment of a method according to the present invention.
Figure 4:
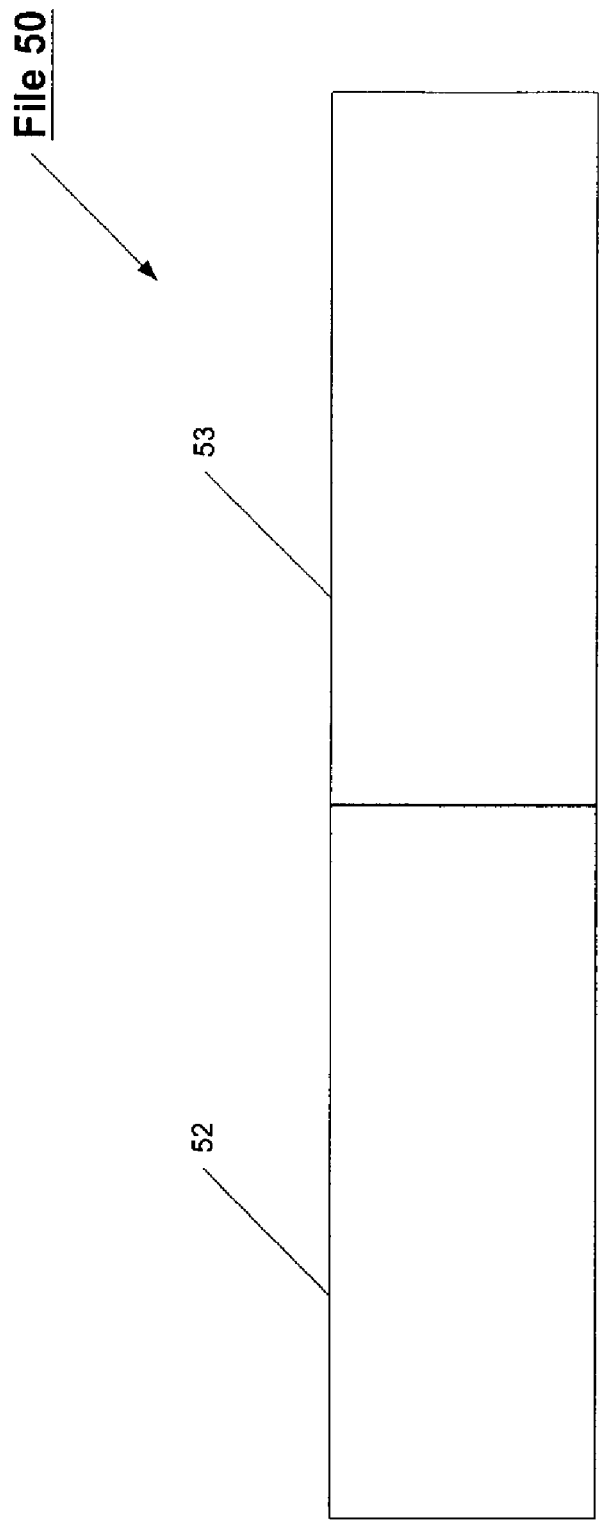
FIG. 4 shows an exemplary message which may be transmitted by the device shown in FIG. 2.

FIG. 3 shows an exemplary embodiment of a method according to the present invention. In step 302, a user A of the device 1 records a voice message using the microphone 8. The device 1 then converts the voice message into a voice message data file 52 is incorporated into an output file 50 (shown in FIG. 4) including the voice message data file 52 as well as optional additional data files 53 including, for example, bar code data, text data, and miscellaneous data (including, for example, photo data, etc.). The bar code data may be obtained via the scanning arrangement of the device 1 or from any other source (e.g.,computer database, etc.). Also, User A may capture data displayed on the screen by utilizing a function "grab screen". The grab screen allows User A to have the data displayed on the screen be stored in a file. Those skilled in the art will understand that the output file 50 may include any number of additional data files including any combination the various types of data.

User A indicates his intention to send the output file 50 to user B's device 41 by, e.g., clicking on a predetermined icon (step 304). A corresponding messaging application (e.g., MS Outlook) is activated. User A addresses the file to User B by providing User B's address (e.g., User B's email address). In an alternative exemplary embodiment of the present invention, user A may address the output file 50 to a predetermined group of users. The output file 50 is then transmitted via the communication network 30 to the device 41 or a group of devices 41 (step 306). The server 20 directs the output file 50 to the appropriate recipient(s), i.e., user B. In addition, the server 20 may store a copy of the output file 50 as a back up which may, for example, be resent to user B if the original output file 50 is lost or damaged. Alternatively, the server 20 may periodically resend the output file 50 for so long as no response is received from the user B within a predetermined time period.

User A may also designate a level of importance of the output file 50. For example, if the output file 50 has the highest level of importance, it will supercede any other files 50 addressed to user B. Thus, the server 20 will prioritize all messages to user B accordingly.

After the output file 50 has been received by the device 41, the voice message data file 52 is automatically self-extracted from the output file 50 and played to user B via the speaker 10 (step 308) while the additional data file(s) 53 are displayed on a display of the device 1. Step 308 may be performed without any interaction on the part of user B so that the voice message is initially played to the user B as soon as it is received. For example, a prerecorded message (e.g., "a file is received") may be played to User B. Thus, user B does not need to constantly check for such files 50 as the audio portion 52 of the output file 50 immediately alerts the user B to the message. In addition, further reminders of the message may be provided to the user B until, for example, a predetermined completion task (e.g. reply message) has been completed. The user B may also view the optional data 54 using the output arrangement 2.

Alternatively, in step 308, the voice massage data file 52 is not played and the additional data file(s) 53 are not displayed automatically. Instead, the device 41 informs the user that the files 52 and 53 are received and awaiting the user. The user may be informed, e.g., via blinking screen, flashing LED and sound beeps. When the user is ready to listen and view the data, the user may instruct the device 41 to play the file 52 and to view the flies 53 by, e.g., pressing an appropriate button, etc.

Furthermore, user B may forward the output file 50 to any desired user or group of users. User B may also generate a response which may include a new voice message, new text data, new data (e.g., the grab screen), etc. The response would be stored in a file (e.g., substantially similar to the output file 50) and transmitted to user A and/or other users in a substantially similar manner as it was transmitted to user B.

The present invention may be utilized in a plurality of industries. For example, the present invention may be utilized in a retail industry, such a store. A cashier may record a voice message "we need a price check on product X" and address this message to an appropriate clerk or department in the store. The cashier's voice message is saved as a voice message file 52 and may be accompanied by a corresponding text message (e.g., "let me know if there is one in color X") which is saved in an additional data file 53. These two files are associated with one another and sent off to the target clerk as an output file 50. The target clerk's handheld scanning device will receive this output file 50 automatically extract the voice message data from the file 50 and play this message while extracting and displaying the text from the file 50. The clerk may then obtain the price for the product X (e.g., by scanning a bar code of the product X) which data is then saved as an additional data file 53 and record a response voice message in a new voice message file 52 which is sent to the cashier and include any other associated additional data files 53 (e.g., text, photo images, grab screen, etc.). The reply voice message may then be automatically played and the bar code data may either be displayed for the cashier for scanning or directly entered into the cashier's register. Alternatively, the cashier may manually enter pricing information into the cash register.

There are many modifications to the present invention which will be apparent to those skilled in the art without departing from the teaching of the present invention. The embodiments disclosed herein are for illustrative purposes only and are not intended to describe the bounds of the present invention which is to be limited only by the scope of the claims appended hereto.

What is claimed is:

1. An optical imaging device comprising:
   an optical imaging apparatus for optically reading encoded data and storing the data in a data file;
   a voice recording apparatus for recording a voice message and storing the message in a message file;
   a voice reproducing apparatus;
   a file handling apparatus for assembling a transmission file and addressing the transmission file to an intended recipient device, wherein the transmission file includes the message and data files, the transmission file being configured so that, upon receipt by a recipient device, the message file is automatically executed and played via the voice reproducing apparatus of the recipient device, the file handling apparatus allows a user to designate a plurality of recipients with different handling instructions for corresponding recipients; and
   a communication apparatus for communicating with further devices via a network, wherein the communication apparatus forwards the transmission file to the recipient device of the further devices via the network.

2. The device according to claim 1, wherein the device is at least one of a mobile device, a wearable scanner, a scanning terminal and a ring terminal.

3. The device according to claim 1, wherein the device, the further devices and the network communicate using a wireless protocol.

4. The device according to claim 3, wherein the wireless protocol is one of Bluetooth protocol and a IEEE 802.11 protocol.

5. The device according to claim 1, further comprising:
   a digital camera for generating digital images; and
   a display for displaying the data and the digital images.

6. The device according to claim 5, wherein the transmission file includes the digital images.

7. The device according to claim 1, wherein the data file is displayed on a display of the recipient device.

8. An optical imaging system, comprising:
   a plurality of optical imaging devices coupled to one another via a network, each of the optical imaging devices including:
   apparatus for optically reading encoded data and storing the data in a data file;
   a voice recording apparatus for recording a voice message and storing the message in a message file;
   a voice reproducing apparatus;
   a file handling apparatus for assembling a transmission file and addressing the transmission file to an intended recipient one of the plurality of devices, wherein the transmission file includes the data and message files, the transmission file being configured so that, upon receipt by the recipient device, the message file is automatically executed and played, the file handling apparatus allows a user to designate a plurality of recipients with different handling instructions for corresponding recipients; and
   a communication apparatus for communicating with other devices of the plurality of devices via the network, wherein the communication apparatus forwards the transmission file to the recipient device via the network.

9. The system according to claim 8, wherein first one of the devices is a mobile device.

10. The system according to claim 8, wherein second one of the devices is a stationary device.

11. The system according to claim 8, wherein the network includes a wireless network.

12. The system according to claim 8, wherein one of the devices is a ring scanner.

13. The system according to claim 8, wherein one of the devices includes a digital camera generating a digital image and a display for displaying the data and the digital image.

14. The system according to claim 13, wherein the data is bar code data.

15. A method of managing communications between a plurality of optical imaging devices connected to one another via a network, comprising the steps of:
   recording at a first one of the optical imaging devices a voice message and storing the message in a message file;
   assembling a transmission file including the message file and one of text, optically scanned data and digital image data and an autoexecutable file portion which directs a recipient device to automatically execute the message file immediately upon receipt of the transmission file;
   designating a plurality of recipients with different handing instructions for each corresponding recipient;
   addressing the transmission file to an intended recipient device; and
   transmitting the transmission file over the network to the recipient device.

16. The method according to claim 15, further comprising the step of:
   upon receiving of the transmission file by the receipting device, executing the message file and displaying one of the text, the optically scanned data and the digital image data.

17. The method according to claim 15, wherein the assembling step is performed utilizing a messaging application.

18. The method according to claim 15, wherein the recording and assembling steps are performed in response to a request for a bar code scan.

* * * * *